(12) United States Patent
Ramet et al.

(10) Patent No.: US 11,923,740 B2
(45) Date of Patent: Mar. 5, 2024

(54) STATOR FOR A ROTARY ELECTRICAL MACHINE

(71) Applicant: Valeo Equipements Electriques Moteur, Creteil (FR)

(72) Inventors: Vincent Ramet, Étaples-sur-Mer (FR); Jean Duquesne, Étaples-sur-Mer (FR); Stéphane De Clercq, Étaples-sur-Mer (FR); Julien Pauwels, Étaples-sur-Mer (FR); Humberto Menezes, Étaples-sur-Mer (FR); Laurent Delassus, Étaples-sur-Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 322 days.

(21) Appl. No.: 16/762,690

(22) PCT Filed: Dec. 19, 2018

(86) PCT No.: PCT/EP2018/085905
§ 371 (c)(1),
(2) Date: May 8, 2020

(87) PCT Pub. No.: WO2019/121959
PCT Pub. Date: Jun. 27, 2019

(65) Prior Publication Data
US 2021/0175764 A1    Jun. 10, 2021

(30) Foreign Application Priority Data

Dec. 20, 2017    (FR) ...................................... 1762641

(51) Int. Cl.
*H02K 3/28*    (2006.01)
*H02K 1/16*    (2006.01)
(Continued)

(52) U.S. Cl.
CPC ................. *H02K 3/28* (2013.01); *H02K 1/16* (2013.01); *H02K 3/12* (2013.01); *H02K 15/0414* (2013.01);
(Continued)

(58) Field of Classification Search
CPC .......... H02K 3/12; H02K 3/28; H02K 15/064; H02K 1/28; H02K 1/16; H02K 3/505; H02K 15/0414; Y10T 29/53143
(Continued)

(56) References Cited

U.S. PATENT DOCUMENTS 9,166,451 B2 * 10/2015 Han ...................... B60L 50/51
9,871,417 B2 * 1/2018 Saito ...................... H02K 29/03
(Continued)

FOREIGN PATENT DOCUMENTS

| CN | 103339834 A | 10/2013 |
| CN | 103580403 A | 2/2014 |

(Continued)

OTHER PUBLICATIONS

International Search Report and Written Opinion in corresponding International Application No. PCT/EP2018/085905, dated Jan. 25, 2019 (13 pages).

(Continued)

*Primary Examiner* — Thiem D Phan

(57) ABSTRACT

The invention relates to a stator (200) comprising an annular body (210) provided with a plurality of slots (213) and a winding (400) comprising a first series (A) of needles (1) and a second series (B) of needles (1) which are arranged in the slots (213) in a plurality of superimposed layers (C1-C4), each needle (1) comprising a first segment (1A) and a second segment (1B) which are each arranged in different slots (213) and connected by an elbow connector (1C). According to the invention, the first segments (1A) and the second (Continued)

segments (1B) of the first series (A) are respectively arranged in a first layer (C1) and in a second layer (C2) and the first segments (1A) and the second segments (1B) of the second series (B) are respectively arranged in a third layer (C3) and in a fourth layer (C4), the first series (A) being electrically connected to the second series (B).

11 Claims, 9 Drawing Sheets

(51) Int. Cl.
*H02K 3/12* (2006.01)
*H02K 15/04* (2006.01)
*H02K 15/06* (2006.01)

(52) U.S. Cl.
CPC ...... *H02K 15/064* (2013.01); *Y10T 29/53143* (2015.01)

(58) Field of Classification Search
USPC .................. 29/732, 596, 598, 729, 734, 735
See application file for complete search history.

(56) References Cited

U.S. PATENT DOCUMENTS

| | | |
|---|---|---|
| 2005/0258703 A1 | 11/2005 | Kouda et al. |
| 2009/0001841 A1 | 1/2009 | Naganawa et al. |
| 2011/0241461 A1 | 10/2011 | Utaka |
| 2014/0033514 A1 | 2/2014 | Chamberlin et al. |
| 2014/0184011 A1 | 7/2014 | Kaimori et al. |
| 2017/0257000 A1 | 9/2017 | Wilquin et al. |
| 2017/0324286 A1 | 11/2017 | Akimoto et al. |

FOREIGN PATENT DOCUMENTS

| | | |
|---|---|---|
| EP | 1109295 A2 | 6/2001 |
| EP | 2698901 A1 | 2/2014 |
| JP | 2009-011116 A | 1/2009 |
| JP | 2009-183070 A | 8/2009 |
| JP | 2011-229367 A | 11/2011 |
| JP | 2013-059156 A | 3/2013 |
| KR | 20130005576 A | 1/2013 |

OTHER PUBLICATIONS

Notification of Reason for Rejection issued in Japanese Patent Application No. 2020-534323, dated May 6, 2022 (11 pages).
The First Office Action issued in Chinese Application No. 201880078024.5, dated Nov. 24, 2021 (14 pages).
Final Office Action Issued in Corresponding JP Application No. 2020-534323, dated Mar. 24, 2023. (12 Pages with English Translation).

* cited by examiner

STATOR FOR A ROTARY ELECTRICAL MACHINE

The present invention relates to a rotary electrical machine such as an alternator or an alternator-starter or a reversible machine or an electrical machine for a motor vehicle. The invention concerns more particularly a stator for a rotary electrical machine comprising a winding created from conductive pins.

A rotary electrical machine comprises a shaft integral with a rotor, and a stator arranged such as to surround the rotor. The rotor and the stator cooperate by means of a magnetic field. For this purpose, the rotor is for example provided with permanent magnets, and the stator is provided with an electrical winding. Alternatively, the rotor can be a rotor with claws formed by two magnet wheels which can be provided with magnets which are or are not permanent. According to a first operating mode, known as the motor mode, the electrical winding is supplied with electric current by means of an electronic module, such as to generate a rotary magnetic field at the electrical winding, in order to rotate the rotor. According to a second operating mode, known as the generator mode, the rotor is rotated by means of the thermal engine of the vehicle, such as to generate a rotary magnetic field at the electrical winding of the stator which is recuperated as electric current by the electronic module.

The stator comprises a yoke forming a part of revolution around an axis which passes via the centre of the stator. The yoke comprises radial teeth extending radially towards the centre of the stator, and around which the electrical winding is created. More particularly, the radial teeth delimit between one another notches in which there pass conductive elements which participate in forming the winding of the stator.

The winding of the stator can be created in different ways, for example by means of a needle device guiding the winding of a single electric wire around each radial tooth in order to form successive turns. Nevertheless, this embodiment involves a difficulty of implementation in order to parameterise the path of the needle guiding the electric wire through the notches. In particular, this embodiment may not be possible when the angular spacing between two successive radial teeth is not sufficient to permit the passage of a needle bearing wire to be wound around the tooth.

In order to eliminate this disadvantage, another winding method consists of inserting a plurality of conductive pins in the notches delimited by the radial teeth, then connecting their free ends electrically in pairs in order to form a continuous electrical path. More specifically, each conductive pin comprises two conductive segments which are substantially parallel to one another, and are connected electrically by an elbow connector in the form of a "U".

The conductive segments are inserted at a first axial end face of the stator, in two distinct notches. When the conductive segments of the conductive pins are inserted in the notches, the bent portions project from the first axial end face of the stator, and the free ends of the conductive segments emerge from a second axial end face of the stator. Thus, advantageously, it is not necessary to resort to a needle device as mentioned above. This operation is repeated as many times as necessary in order to fill each notch with the same number of conductive segments, and to form different layers of the winding. The conductive segments of a single pin are disposed in a single layer of the winding, such that the free ends of the conductive segments are then connected to one another so as to form electrical paths generating magnetic fields along the radial teeth, when they have an electric current passing through them. In other words, the conductive pins are connected in pairs in order to form different electrical paths, with each electrical path being able to participate in the formation of a supply phase of the rotary electrical machine. For example, in the case of an alternator-starter for a motor vehicle, distinct electrical paths permit a three-phase current supply to the winding. This embodiment makes possible a winding of the stator comprising radial teeth which are distinctly closer than in the preceding alternative. However, according to this winding method, the bent portions of the conductive pins, projecting from the first axial end face of the stator, increase the axial size of the stator. In addition, it is necessary to use numerous electrical connectors for connection between the conductive pins, for the purpose of forming the different electrical parts.

The objective of the invention is to propose an original solution for arrangement of conductive pins in the layers of a stator of a rotary electrical machine, and for connection between the conductive pins, in order, without this being limiting, to reduce the size of the stator when the winding is formed on the stator, whilst reducing the number of electrical connectors necessary for connection between the conductive pins.

The invention thus proposes a stator for a rotary electrical machine which is designed to equip a vehicle, with the stator comprising an annular body around an axis and a winding, the annular body comprising a plurality of notches distributed circumferentially regularly around the annular body, and the winding comprising a first series of conductive pins and a second series of conductive pins arranged in the notches in a plurality of superimposed layers of the winding in a radial direction, i.e. at least a first layer, a second layer, a third layer and a fourth layer which succeed one another, such that the first layer is radially on the exterior and the fourth layer is radially in the interior. Each conductive pin comprises a first segment and a second segment which are connected by an elbow connection, such that the segments of a single conductive pin are disposed in distinct notches.

According to the invention, the first segments and the second segments of the first series of pins are arranged respectively in the first layer of the winding and in the second layer of the winding, and the first segments and the second segments of the second series of pins are arranged respectively in the third layer of the winding and in the fourth layer of the winding, with the first series of pins being connected electrically to the second series of pins.

However, the invention is not limited to a winding arranged in four layers in each notch. It will be possible to provide a configuration of the winding comprising an even number of layers greater than four. A configuration of this type is then created by an arrangement of series of pins disposed in succession from the exterior towards the interior, without superimposition of the series of pins forming the layers.

Hereinafter in the present document, the terms "radial/axial" and "interior/exterior" refer to the axis of the annular body of the stator; and the terms "series of conductive pins/series of pins/series", and the terms "conductive pin/pin" are used without distinction from one another.

"Electrical path" means a continuous electrical path through which a single electric current passes.

The conductive pins of the first series of pins and the conductive pins of the second series of pins are advantageously formed in the same manner. It will be understood that the first series of pins is radially exterior, whereas the second series of pins is radially interior. The pins of the first series have dimensions which are slightly larger than those of the second series, in order to compensate for their exterior position on a diameter which is slightly larger than the diameter on which the interior pins are disposed.

The conductive pins are each fitted in two distinct notches by engagement of their first and second segments, such that the segments of a single conductive pin occupy two different notches in the annular body. The segments of a single conductive pin are situated on distinct layers of the winding, and consecutively relative to one another. More particularly, the segments of a pin of the first series are situated on the first and second layers, and the segments of a pin of the second series are situated on the third and fourth layers.

When the segments of the conductive pins are accommodated in their notch, the elbow connection of each pin emerges from the annular body from a first axial end of the body, and the segments of each pin emerge from the annular body by ends from a second axial end of the body.

From the first axial end of the annular body, the elbow connections of two conductive pins of a single series of pins are advantageously adjacent and parallel to one another. The particular configuration of the elbow connections thus makes it possible to reduce the axial size of the stator.

According to a characteristic of the invention, the elbow connection of each pin is formed by a first linear section and a second linear section which are connected to one another electrically by a corkscrewed section, with the first linear section being connected electrically to the first segment, and the second linear section being connected electrically to the second segment, and the second linear section of a pin of the first series of pins and the first linear section of a pin of the second series of pins are adjacent and facing one another. It should be noted that, in a single series of pins, the corkscrewed sections of the elbow connections are not superimposed. In addition, it will be noted that the elbow connections of two distinct series of pins are not superimposed.

According to one embodiment, each elbow connection can be formed by a single conductor, such that an elbow connection, of the two conductive segments and of the two free ends of a single pin, are formed from a single electrical conductor extending in particular in the form of a "U". Alternatively, each elbow connection can be formed by two ends connected together. Thus, an elbow connection, two conductive segments and two free ends of a single pin are formed from two conductive bars which are connected together.

According to a characteristic of the invention, ends of the segments of the conductive pins of the first series of pins, known as exterior, are connected electrically in order to form a first electrical path along the first series of pins, and ends of the segments of the conductive pins of a second series of pins, known as interior, are connected electrically in order to form a second electrical path along the second series of pins, with the first electrical path and the second electrical path being designed to form an electrical path of the rotary electrical machine.

It will be understood that the first electrical path and the second electrical path are connected electrically to one another by means of electrical connection units in order to form the said electrical path of the rotary electrical machine, at the ends of which there are disposed conductors permitting the electrical connection to a supply source, via diode bridges or transistors in particular, or to another electrical path in order to form the coupling, either directly to another phase or to a neutral point. It should be noted that the first electrical path is radially exterior, whereas the second electrical path is radially interior.

It will also be understood that the rotary electrical machine comprises a plurality of electrical parts in order to form the winding of the stator. For example, the rotary electrical machine can comprise six electrical paths forming two systems of three phases.

In addition, the electrical paths can advantageously permit a configuration of the winding in the form of a star. However, the invention is not limited to this configuration, and it will be possible to envisage that the electrical paths permit a configuration of the winding in the form of a triangle.

The segments of a single conductive pin are spaced by a number of notches equal to N−1, with this number N corresponding to the number of electrical paths of the rotary electrical machine.

According to a characteristic of the invention, a first conductor and second conductor of an element for electrical connection between two series of concentric conductive pins are partly disposed in distinct notches, with the first conductor occupying one of the layers of the winding which are common to the first series of pins, and the second conductor occupying one of the layers of the winding which are common to the second series of pins, the first conductor and the second conductor being connected electrically to one another. More particularly, the first conductor and the second conductor are connected electrically from the first axial end of the annular body of the stator, with the first conductor and the second conductor occupying two distinct layers of the winding, and being separated from one another by at least one layer.

In particular, these two conductors can be arranged in layers which are separated by a single intermediate layer.

According to one embodiment, the first conductor and the second conductor are connected directly to one another. "Connected directly" means that the first conductor and the second conductor are connected to one another without an intermediate element.

According to one embodiment, the first series of pins is connected electrically in series to the second series of pins. This makes it possible to improve the torque produced by the machine.

According to a first variant embodiment, the first conductor occupies the first layer of the winding and the second conductor occupies the third layer of the winding.

According to a second variant embodiment, the first conductor occupies the second layer of the winding and the second conductor occupies the fourth layer of the winding.

Furthermore, more than one intermediate layer, in this case two, can be present between the layers in which the conductors are arranged. According to a third variant embodiment, the first conductor occupies the first layer of the winding, and the second conductor occupies the fourth layer of the winding.

According to a characteristic of the invention, the first conductor and the second conductor each comprise a linear portion and a curved portion, with the linear portions being accommodated in their respective notch, and the curved portions being connected electrically to one another.

In addition, the first conductor and the second conductor each comprise an electrical connection portion, the linear portion of the first and second conductors is advantageously delimited by the curved portion emerging from the annular body from the first axial end thereof, and by the electrical connection portion emerging from the annular body from the second axial end thereof.

From the second axial end of the annular body, the first and second electrical paths each comprise a first end and a second end. It will be understood that the ends of the first and second paths are formed respectively by an end of a segment of a conductive pin, which pin is not connected electrically to a segment end of a pin of the same series.

The first end of the first electrical path is advantageously connected electrically to the electrical connection portion of the first conductor, and the first end of the second electrical path is advantageously connected electrically to the electrical connection portion of the second conductor.

It will thus be understood that the first conductor and the second conductor make it possible to connect the first electrical path and the second electrical path to one another electrically in order to form the electrical path of the rotary electrical machine. In other words, the first, radially exterior electrical path is connected electrically to the second, radially interior electrical path by means of an electrical connection element formed by a first conductor and a second conductor which are associated, in order to form the said electrical path through which a single electric current passes.

According to a characteristic of the invention, a first electrical connection unit and a second electrical connection unit are partly disposed in distinct notches, with the first electrical connection unit occupying the same layer of the winding as the first conductor of the electrical connection element, in order to form a first terminal end of the said electrical path, and with the second electrical connection unit occupying the same layer of the winding as the second conductor of the electrical connection element, in order to form a second terminal end of the said electrical path.

The first electrical connection unit and the second electrical connection unit each comprise a linear portion which is delimited by a first portion emerging from the annular body from the first axial end of the annular body, and a second portion emerging from the annular body from the second axial end of the annular body.

The first portion of the first electrical connection unit is designed to form the first terminal end of the electrical path of the rotary electrical machine, and the second portion of the first electrical connection unit is connected to the second end of the first electrical path. Similarly, the first portion of the second electrical connection unit is designed to form the second terminal end of the electrical path of the rotary electrical machine, and the second portion of the second electrical connection unit is connected to the second end of the second electrical path.

According to a characteristic of the invention, the first and second conductors of an electrical connection element and the first and second electrical connection units are separated by the same number of notches.

According to a characteristic of the invention, in order to connect electrically the first conductor and the second conductor of an electrical connection element, the curved portion of at least one of these conductors overlaps at least part of a pin of one of the series of pins.

According to a characteristic of the invention, at least one small electrical connection bar is arranged between two notches, with the small bar having two conductive portions occupying a single layer of the winding in each of these two notches, and a connection part connecting these two conductive portions, and with the layer of the winding which is occupied by the two conductive portions being distinct from the layers occupied by the first and second conductors.

According to a particular feature, at least one conductive portion of the small bar is arranged in the notch which receives the first conductor.

Advantageously, two small electrical connection bars are each arranged between two notches, with each small bar having two conductive portions occupying a single layer of the winding in each of these two notches, and with a connection part connecting these two conductive portions, the layer of the winding which is occupied by the two conductive portions being distinct from the layers occupied by the first and second conductors, and the layers occupied by the conductive portions of each small bar being distinct from one another.

These small electrical connection bars advantageously make it possible to ensure that, in a single notch, the segments of the conductive pins and/or the linear portions of the conductors and of the electrical connection units have an electric current passing through them respectively, such that the currents are oriented in the same direction of circulation. It is been found that an arrangement of this type makes it possible to homogenise the magnetic field of the stator.

Advantageously, in a single notch, the electric current which passes through the segments of conductive pins and/or the linear portions of the conductors and of the connection units is the electric current passing along the same electrical path.

According to a characteristic of the invention, the connection part of the small bar overlaps at least part of a pin of one of the series of pins. More particularly, the connection part of the small bar overlaps at least one corkscrewed section of an elbow connection of a pin.

According to a characteristic of the invention, the curved portion of at least one of the first or second conductors overlaps the connection part of the small bar.

The invention also relates to a rotary electrical machine comprising a stator according to any one of the characteristics of the invention according to the present document. The rotary electrical machine can form an alternator or an alternator-starter or a reversible machine or also an electric motor.

Advantageously, the machine comprises two series of three electrical paths which are dedicated both to operation in alternator mode and to operation in motor mode.

Other characteristics, details and advantages of the invention will become more apparent from reading the following description provided hereinafter by way of indication in relation with the drawings in which.

Figure 1:
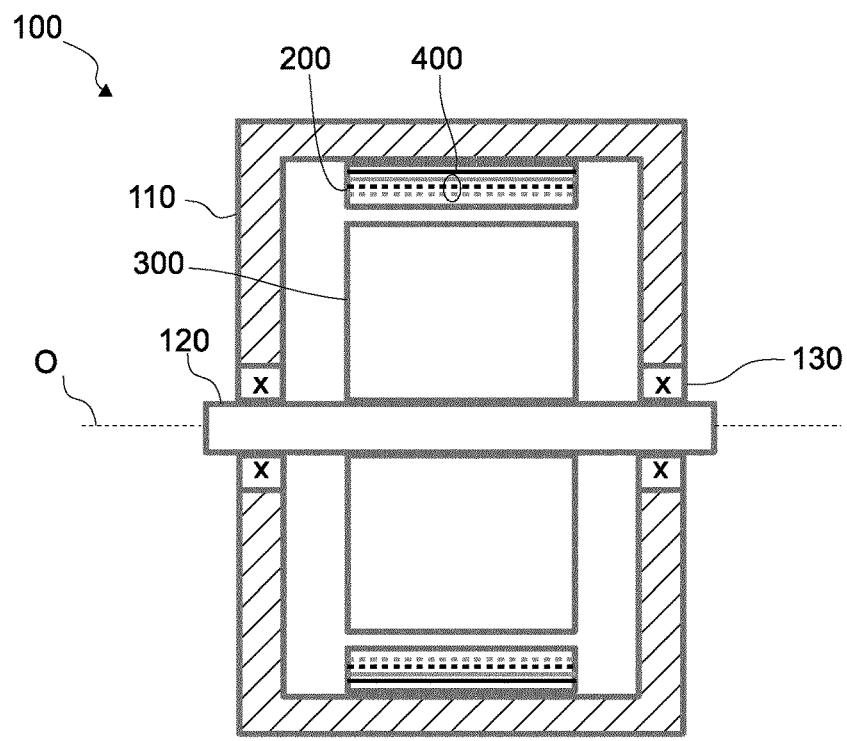
FIG. 1 illustrates a schematic view of a rotary electrical machine.

As illustrated in FIG. 1, a rotary electrical machine 100 comprises an envelope 110 accommodating a stator 200 and a rotor 300 which is radially disposed in the interior of the stator 200. The stator 200 is equipped with a winding 400. For example, the rotor 300 is equipped with permanent magnets, preferably accommodated in notches in a rotor body formed by a stack of metal plates forming magnetic poles. Alternatively, the rotor can be formed by two magnet wheels which are or are not equipped with permanent magnets, with the claws of the magnet wheels also forming magnetic poles. A drive shaft 120 which is integral with the rotor 300 makes it possible to transmit the torque of the rotary electrical machine 100. The drive shaft 120 is supported by the envelope 110 of the rotary electrical machine 100 via roller bearings 130. In a motor mode, when the rotary electrical machine 100 is supplied with current, the control of this supply permits the creation of a rotary electrical field by means of the winding 400 of the stator 200, which, by means of the magnets associated with the rotor 300, then rotates the rotor 300 around an axis O which is common to the stator 200 and to the rotor 300. The drive shaft 120 is then rotated around the axis O, and the rotary electrical machine 100 can transmit the torque required to the thermal engine. In an alternator mode, the rotation of the drive shaft and of the rotor 300 generates the creation of a magnetic field, and subsequently the appearance of a current in the winding, which current is designed to be rectified by an appropriate bridge of diodes or of transistors, in order to supply power to the electrical consumers of the vehicle and to recharge the battery.

An electronic assembly can in particular be fitted on a side of the machine in the interior or on the exterior of the envelope 110. This assembly comprises for example a power module which makes it possible to rectify the electric current of the stator, and a control module which makes it possible to control the machine. Alternatively, the electronic assembly can be separate from the rotary electrical machine, and fitted on the vehicle in a separate manner.

Figure 2:
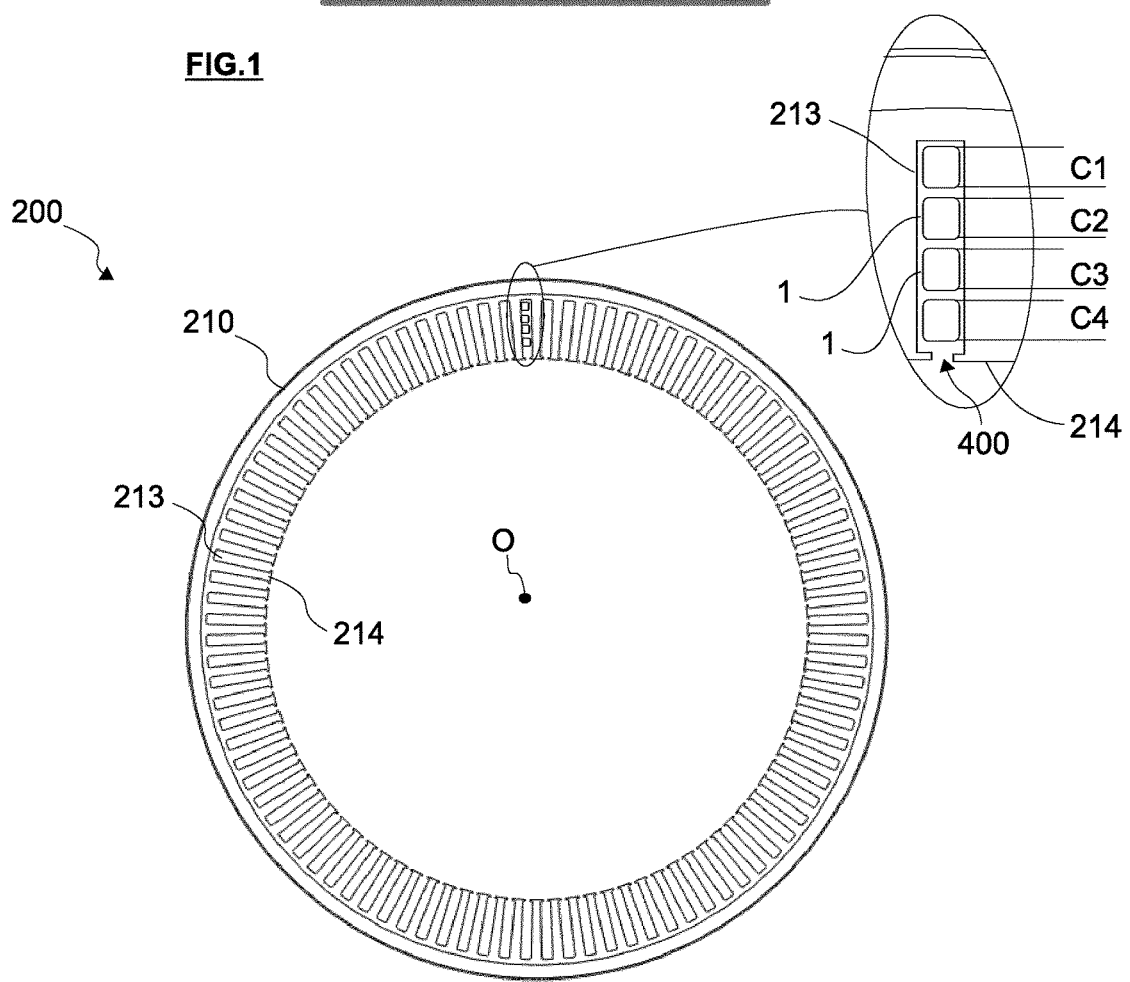
FIG. 2 illustrates a view in cross-section of a stator represented by an annular body comprising a plurality of notches designed to be equipped with conductive pins according to the invention in order to form a plurality of layers of a winding.
Figure 3:
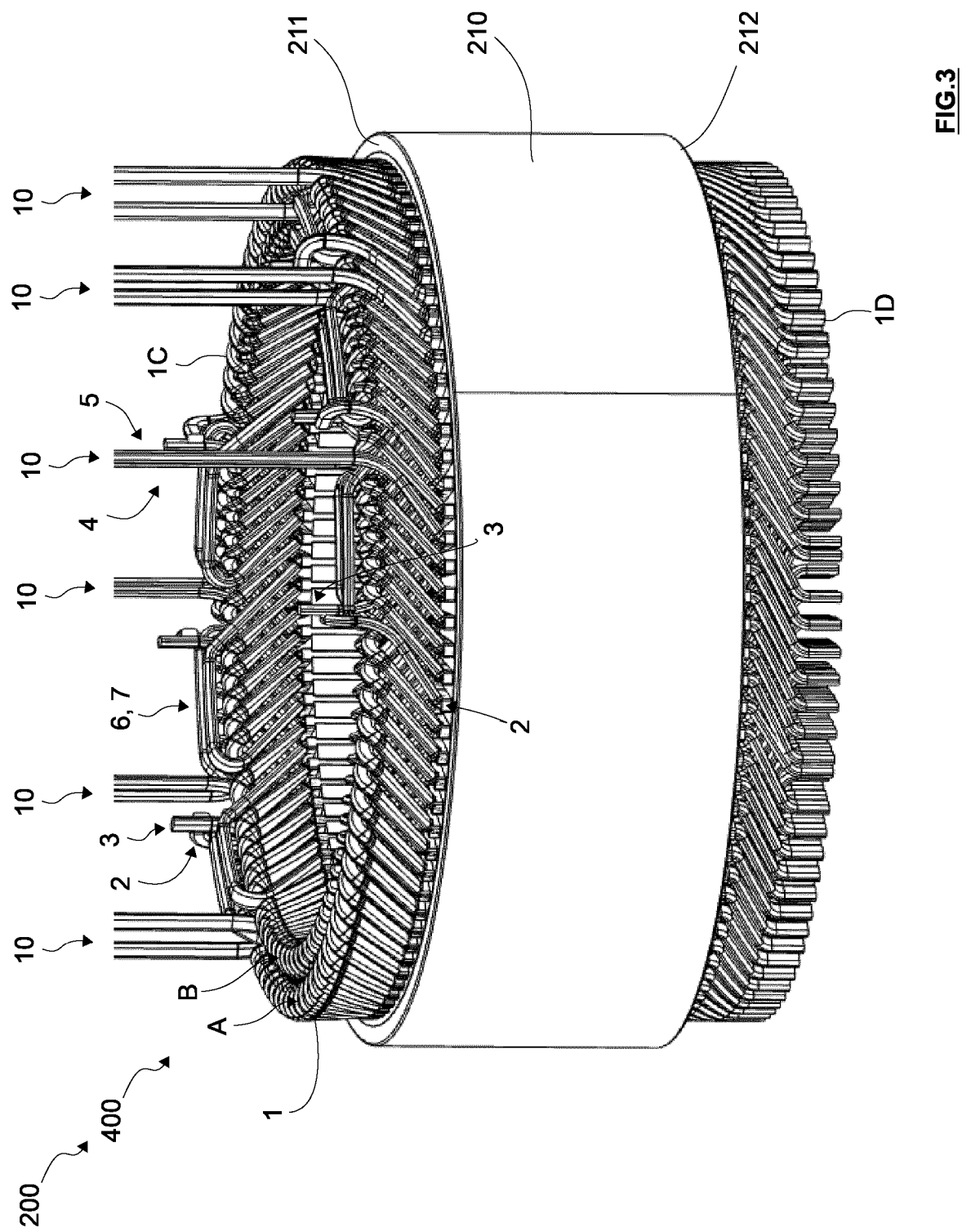
FIG. 3 illustrates a view in perspective of a stator equipped with a winding according to a first embodiment of the invention.

FIG. 2 represents a view in cross-section of a stator 200 of this type comprising a plurality of notches 213 which are designed to be equipped with conductive pins 1 forming a winding 400. An enlargement of a notch 213 is shown in detail, comprising elements of this winding 400. It will be understood that the arrangement thus illustrated is the same for each of the notches 213. The stator 200 comprises an annular body 210 around the axis O. The annular body 210 of the stator 200 is delimited axially by a first axial end 211 and by a second axial end 212 opposite one another, as illustrated in FIG. 3. The annular body 210 comprises a plurality of notches 213 which are distributed circumferentially regularly around the annular body 210. The notches 213 are delimited by teeth 214 extending radially in the interior of the annular body 210. The notches 213 are filled with conductive pins 1, such as to form a plurality of layers C1-C4 of the winding 400 of the rotary electrical machine 100. More particularly, the conductive pins 1 fill the notches 213 in the annular body 210 in order to form four successive layers C1-C4 of the winding 400 hereinafter known as the first layer C1, second layer C2, third layer C3 and fourth layer C4. The layers C1-C4 of the winding 400 are advantageously superimposed on one another in the notches 213 in the annular body 210, such that the first layer C1 of the winding 400 is situated radially on the exterior relative to the axis O, and the fourth layer C4 of the winding 400 is situated radially in the interior relative to the axis O. It will be understood that the first layer C1 and the second layer C2 are radially exterior layers, and that the third layer C3 and the fourth layer C4 are radially interior layers. The second layer C2 is radially exterior relative to the third layer C3.

The four layers C1-C4 thus formed are given by way of non-limiting example. Thus, it will be possible to provide a configuration of the winding 400 comprising an even number of layers greater than four, without however departing from the spirit of the invention. A configuration of this type is thus created by an arrangement of series of pins disposed in succession from the exterior towards the interior, without superimposition of two series of concentric and directly successive pins.

In the embodiments described hereinafter, the machine is a double three-phase electrical machine comprising two systems of three phases each. For example, the number of magnetic poles on the rotor 300 is defined as 16, and the number of notches is equal to 96. Alternatively, the number of poles of the rotor can for example be 8, 10, 12 or 14. Alternatively, the number of notches can for example be 48, 60, 72, 84. The current circulating in the first phase system is advantageously offset by approximately 30° electrical relative to the current circulating in the other phase system.

Figure 5:
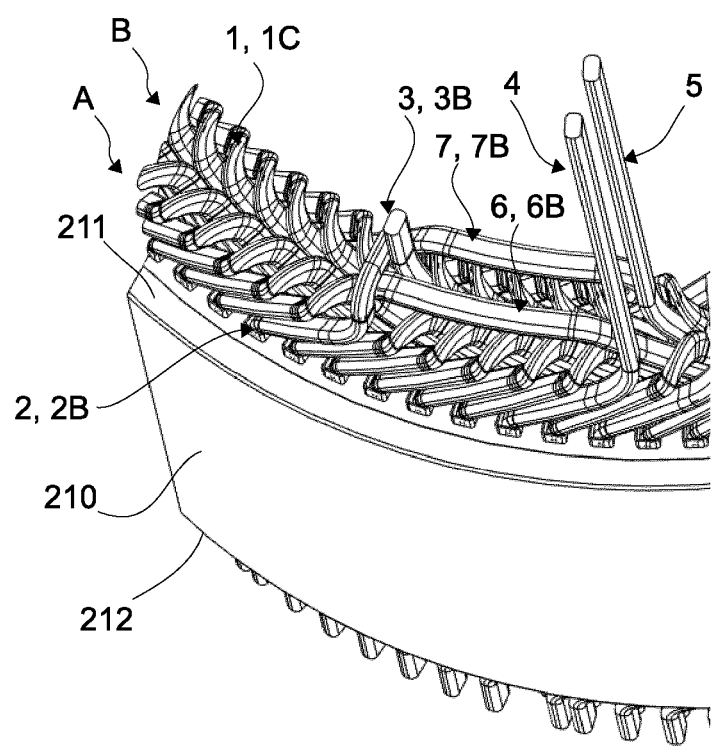
FIG. 5 illustrates a detail of the stator equipped with a winding according to the first embodiment in FIG. 3, which shows in greater detail conductors and electrical connection units permitting the formation of an electrical path according to this first embodiment.
Figure 6:
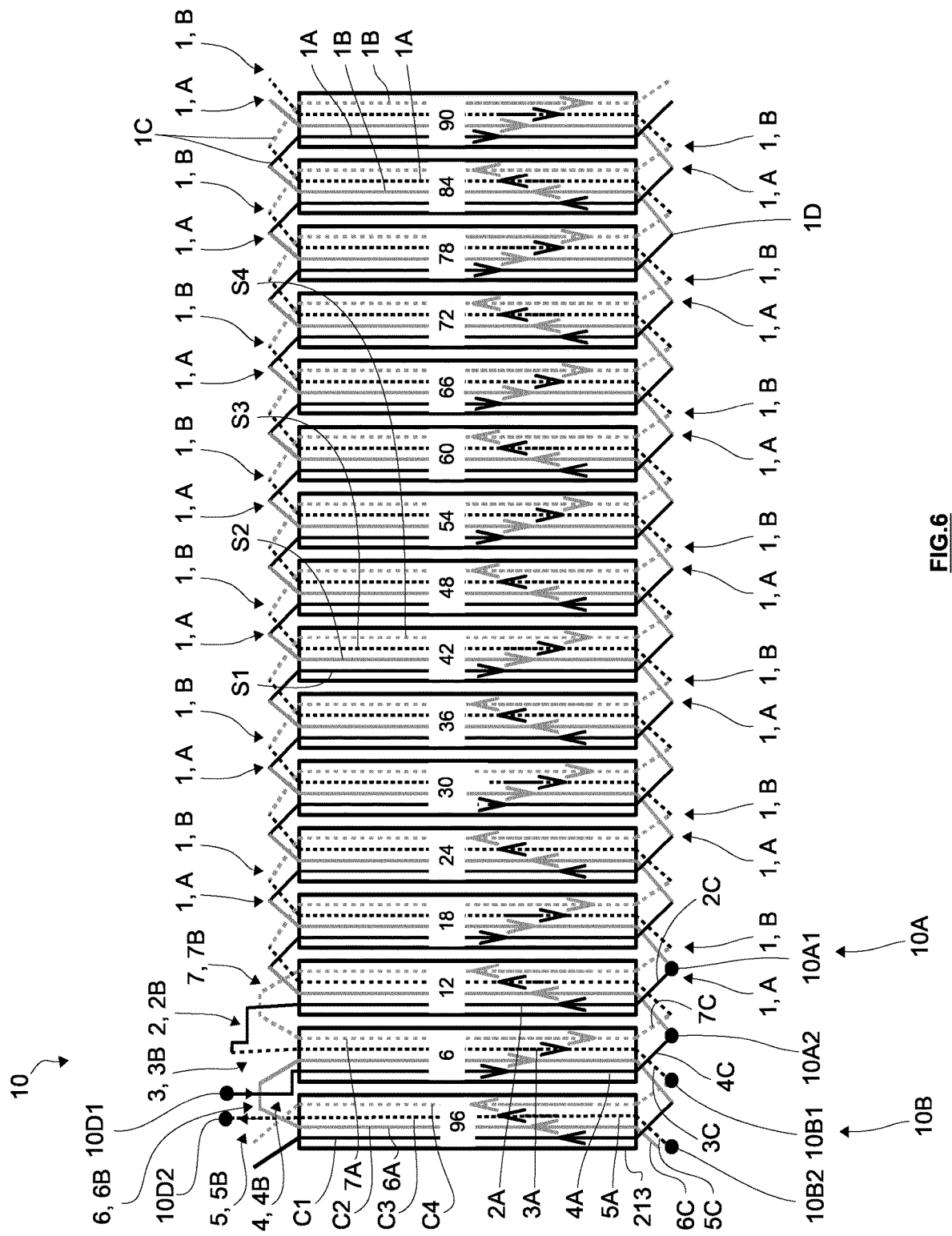
FIG. 6 illustrates schematically an electrical path formed in the stator equipped with a winding according to the first embodiment.

A description in detail will now be provided of the arrangement of the pins 1 participating in the formation of the winding 400, with reference firstly to a first embodiment illustrated in FIGS. 3, 5 and 6, which represent in greater detail the stator 200 equipped with the winding 400 according to this first embodiment. The winding 400 comprises more particularly a plurality of first series A of conductive pins 1 arranged in the first and second layers C1, C2 of the winding 400 and a plurality of second series B of conductive pins 1 arranged in the third and fourth layers C3, C4 of the winding 400. The first series A of conductive pins 1 and the second series B of conductive pins 1 are designed to form a plurality of electrical paths 10 of the winding 400 of the rotary electrical machine 100. In this case, according to this embodiment, the winding 400 comprises six electrical paths 10 forming the phases of the rotary electrical machine 100. The electrical paths 10 of the winding 400 are designed to be connected in two independent groups in order each to receive a three-phase electrical supply, a connection of this type advantageously being created according to a configuration of the winding 400 in the form of a star, without however this being limiting.

It will be noted that the first series A of conductive pins permit the formation of a first, exterior concentric assembly of pins 1, whereas the second series B of conductive pins permit the formation of a second, interior concentric assembly of pins 1.

Hereinafter in the description of this first embodiment, and in order to simplify understanding of the invention, only one of these electrical paths 10 will be described.

An electrical path 10 of this type is advantageously partly formed by a first series A of conductive pins 1, and a second series B of conductive pins 1 arranged in the notches 213 in a plurality of superimposed layers C1-C4 of the winding 400 in a radial direction.

FIG. 6 represents schematically an electrical path 10 of this type of the winding 400 formed by filling a predetermined number of notches 213 equal to 96 in this example. More particularly, the notches 213 which are dedicated to the said electrical path 10 are the notches 213 numbered 6, 12, 18, 24, 30, 36, 42, 48, 54, 60, 66, 72, 78, 84, 90 and 96. It will be understood that there have been represented only the notches 213 in the annular body 210 which are associated with the said electrical path 10, and that two successive notches 213 dedicated to the said electrical path 10 are spaced from one another by a number of notches 213 equal to 5. It will also be understood that this spacing of the notches 213 is designed to form the five other electrical paths 10 of the winding 400 of the stator 200. Hereinafter in the description relative to this first embodiment, reference will be able to be made to FIG. 6 at any time in order to facilitate understanding of the invention.

Going from left to right, in a single notch 213 there are represented the layers C1-C4 of the winding 400 in FIG. 2 which succeed one another, on the understanding that according to the invention, these layers C1-C4 are stacked radially. Thus, there are represented in succession the first layer C1 of the winding 400, the second layer C2 of the winding 400, the third layer C3 of the winding 400 and the fourth layer C4 of the winding 400. The first layer C1 of the winding 400 is represented in dark solid lines, the second layer C2 of the winding 400 is represented in light solid lines, the third layer C3 of the winding 400 is represented in dark broken lines, and the fourth layer C4 of the winding 400 is represented in light broken lines.

Figure 4:
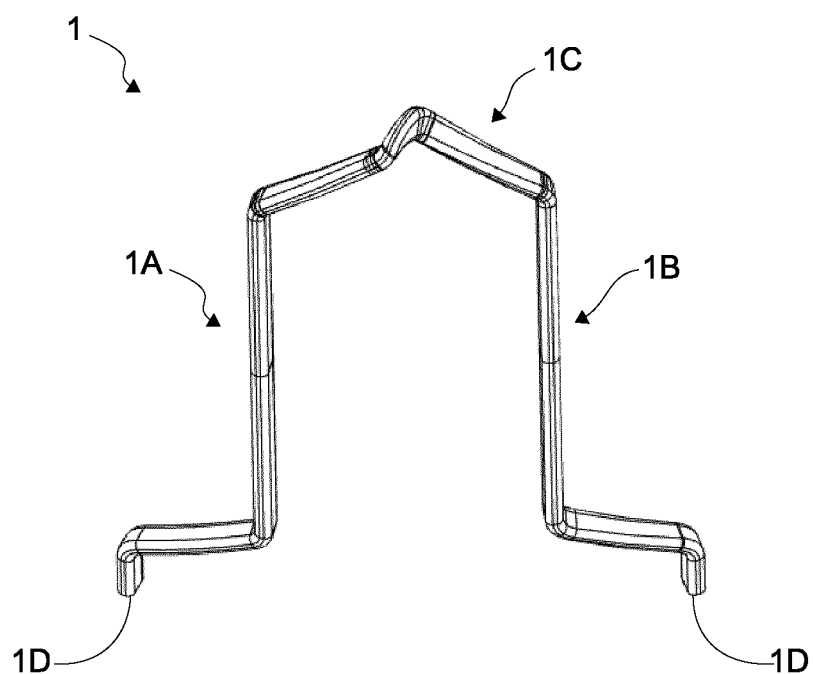
FIG. 4 illustrates a view in perspective of a conductive pin.

With reference to FIG. 4, each conductive pin 1 comprises a first segment 1A and a second segment 1B which are connected by an elbow connection 1C. It will be understood that the segments 1A, 1B and the elbow connection 1C of a single conductive pin 1 form together a continuous current conductor element. The segments 1A, 1B of a single conductive pin 1 are disposed in distinct notches 213 and in distinct layers C1-C4, as will be described subsequently.

The segments 1A, 1B of the conductive pins 1 are inserted in the corresponding notches 213 from the first axial end 211 of the annular body 210, such that the elbow connection 1C of each pin emerges from the annular body 210 from the first axial end 211 thereof, and such that the segments 1A, 1B of each pin emerge from the annular body 210 via ends 1D from a second axial end 212 thereof. When the conductive pins 1 are accommodated in the corresponding notches 213, the portions of the segments 1A, 1B of a single pin 1 emerging via ends 1D from the second axial end 212 of the annular body 210 are bent in opposite directions to one another, such as to retain the conductive pins 1 in the notches 213. This also makes it possible to orient the portions of the segments 1A, 1B of the series A, B of conductive pins 1 disposed in the first and second layers C1, C2 of the winding 400 according to a first orientation, and to orient the portions of the segments 1A, 1B of the series A, B of conductive pins 1 disposed in the third and fourth layers C3, C4 of the winding 400 according to a second orientation.

For example, the elbow connections 1C of the pins of one of the series A, B are oriented according to an anticlockwise direction, and the elbow connections 1C of the pins of the other series A, B are oriented according to a clockwise direction. The terms "clockwise" and "anticlockwise" mean directions opposite one another, and each being oriented around the axis of the stator. According to an alternative, the elbow connections 1C of the pins of the series A, B are oriented according to the same direction, which can be clockwise or anticlockwise.

The segments 1A, 1B of a single conductive pin 1 are spaced by a number of notches 213 equal to N−1, with N corresponding to the number of electrical paths 10 of the rotary electrical machine 100. As defined previously, this number N is in this case equal to 6.

It should be noted that, from the first axial end 211 of the annular body 210, the elbow connections 1C of two consecutive conductive pins 1 of a single series A, B of pins 1 are substantially parallel to one another, without overlapping one another. The particular configuration of the elbow connections 1C thus makes it possible to reduce the axial size of the stator 200.

In addition, the elbow connections 1C of the pins 1 of the first series A of pins 1 are configured such that the first segments 1A of the first series A of pins 1 are arranged in the first layer C1 of the winding 400, and such that the second segments 1B of the first series A of pins 1 are arranged in the second layer C2 of the winding 400. Similarly, the elbow connections 1C of the pins 1 of the second series B of pins 1 are configured such that the first segments 1A of the second series B of pins 1 are arranged in the third layer C3 of the winding 400, and such that the second segments 1B of the second series B of pins 1 are arranged in the fourth layer C4 of the winding 400. It will thus be understood that the segments 1A, 1B of a single pin 1 are situated on layers C1-C4 which are distinct and consecutive relative to one another. It will be understood that two distinct and concentric assemblies of pins are thus formed, i.e. a first, radially exterior assembly formed by the first series A of pins 1, and a second, radially interior assembly formed by the second series B of pins 1.

The first series A of pins 1 is advantageously connected electrically to the second series B of pins 1 in order to form the said electrical path 10. More particularly, in order to form the said electrical path 10, ends 1D of the segments 1A, 1B of the conductive pins 1 of the first series A are connected electrically in order to form a first electrical path 10A, and ends 1D of the segments 1A, 1B of the conductive pins 1 of the second series B are connected electrically in order to form a second electrical path 10B, with the first electrical path 10A and the second electrical path 10B being designed to be connected electrically by an electrical connection element 2, 3, in order to form the said electrical path 10 of the rotary electrical machine 100. The ends 1D of the segments 1A, 1B of the conductive pins 1 of the first series A disposed in the first layer C1 and in the second layer C2 are connected electrically in series. The same applies to the ends 1D of the segments 1A, 1B of the conductive pins 1 of the second series B disposed in the third layer C3 and in the fourth layer C4.

From the second axial end 212 of the annular body 210, the first and second electrical paths 10A, 10B each comprise a first end 10A1, 10B1 and a second end 10A2, 10B2. It will be understood that the ends 10A1, 10B1, 10A2, 10B2 of the first and second paths 10A, 10B are formed respectively by an end 1D of segment of a conductive pin 1 which is not connected electrically to an end 1D of segment 1A, 1B of a pin 1 of the same series A, B.

In particular, an electrical connection element 2, 3 comprises a first conductor 2 and a second conductor 3 which make it possible to connect the first electrical path 10A and the second electrical path 10B electrically to one another.

The first and second conductors 2, 3 each comprise a linear portion 2A, 3A delimited by a curved portion 2B, 3B emerging from the annular body 210 from the first axial end 211 thereof, and by an electrical connection portion 2C, 3C emerging from the annular body 210 from the second axial end 212 thereof. It will be understood that the linear portion 2A, 3A, the curved portion 2B, 3B and the electrical connection portion 2C, 3C of a first or second conductor 2, 3 form together a continuous current conductor element.

In practice, the first conductor 2 and the third conductor 3 are inserted, via their linear portions 2A, 3A, in their respective notch 213, from the first axial end 211 of the annular body 210 of the stator 200. The part of the linear portion 2A, 3A of the first and second conductors 2, 3 emerging from the annular body 210 of the stator 200 from the first axial end 212 is then bent in order to form the electrical connection portion 2C, 3C.

The first and second conductors 2, 3 are disposed in distinct notches 213. In a manner identical to the segments 1A, 1B of a single pin, the first and second conductors 2, 3 connected together are spaced by a number of notches 213 equal to N−1, as previously defined.

The first conductor 2 and the second conductor 3 occupy two distinct layers C1, C3 of the winding 400 which are separated from one another by at least one layer of the winding 400. More particularly, the linear portion 2A of the first conductor 2 occupies one of the layers C1, C2 which are common to the first series A of pins 1, and the linear portion 3A of the second conductor 3 occupies one of the layers C3, C4 of the winding 400 which are common to the second series B of pins 1. The first conductor 2 and the second conductor 3 are connected electrically from the first axial end 211 of the annular body 210 of the stator 200. In greater detail, the linear portion 2A of the first conductor 2 occupies the first layer C1 of the winding 400, and the linear portion 3A of the second conductor 3 occupies the third layer C3 of the winding 400, and these layers are separated from one another by the second layer C2.

It will be understood that the portion of electrical connection 2C, 3C of the first and second conductors 2, 3 has an orientation identical to that of a bent portion of a segment of a pin disposed in the same layer C1, C3 of the winding 400 as the corresponding conductor 2, 3.

The first and second conductors 2, 3 are connected electrically to one another by their curved portion 2B, 3B from the first axial end 211 of the annular body 210 of the stator 200.

With reference to FIG. 5, in order to connect the first conductor 2 and the second conductor 3 according to this first embodiment electrically, the curved portion 2B, 3B of at least one of the first or second conductors 2, 3 overlaps at least part of a pin of one of the series A, B of pins. More particularly, the curved portion 2B of the first conductor 2 overlaps a part of a pin of the first series A. It will be noted that the curved portion 2B of the first conductor 2 extends radially towards the interior until it is in contact with the curved portion 3B of the second conductor 3. Alternatively, the curved portion 3B of the second conductor 3 can extend radially towards the exterior until it is in contact with the curved portion 2B of the first conductor 2.

Alternatively, the curved portions 2B, 3B can be connected to one another by means of an interconnection device.

From the second axial end 212 of the annular body 210, in order to connect the first electrical path 10A and the second electrical path 10B electrically, the first end 10A1 of the first electrical path 10A is advantageously connected electrically to the electrical connection portion 2C of the first conductor 2, and the first end 10B1 of the second electrical path 10B is advantageously connected electrically to the electrical connection portion 3C of the second conductor 3.

It will thus be understood that the first conductor 2 and the second conductor 3 make it possible to connect the first layer C1 of the winding 400 and the third layer C3 of the winding 400 to one another electrically.

A first electrical connection unit 4 and a second electrical connection unit 5 make it possible to form the terminal ends 10D1, 10D2 of the said electrical path 10, in order to be connected to the electrical network of the vehicle via bridges of diodes or of transistors provided on an electronic control board.

The first and second electrical connection units 4, 5 each comprise a linear portion 4A, 5A delimited by a first portion 4B, 5B emerging from the annular body 210 from the first axial end 211 thereof, and by a second portion 4C, 5C emerging from the annular body 210 from the second axial end 212 thereof. It will be understood that the linear portion 4A, 5A, the first and second portions 4B, 4C, 5B, 5C of a first or second electrical connection unit 4, 5 form together a continuous current conductor element.

In practice, the first electrical connection unit 4 and the second electrical connection unit 5 are inserted via their linear portions 4A, 5A in their respective notch 213, from the first axial end 211 of the annular body 210 of the stator 200. The part of the linear portion 4A, 5A of the first and second electrical connection units 4, 5 emerging from the annular body 210 of the stator 200 from the second axial end 212 is then bent in order to form the second portion 4C, 5C.

The first and second electrical connection units 4, 5 are disposed in distinct notches 213. In a manner identical to the segments 1A, 1B of a single pin 1, the first and second electrical connection units 4, 5 connected together are spaced by a number of notches 213 equal to N−1, as previously defined.

The linear portion 4A of the first electrical connection unit 4 occupies the same layer of the winding 400 as the linear portion 2A of the first conductor 2, i.e. the first layer C1 of the winding 400, in order to form a first terminal end 10D1 of the said electrical path 10. The linear portion 5A of the second electrical connection unit 5 occupies the same layer of the winding 400 as the linear portion 3A of the second conductor 3, i.e. the third layer C3 of the winding 400, in order to form a second terminal end 10D2 of the said electrical path 10. It will be understood that the second portion 4C, 5C of the first and second electrical connection units 4, 5 has an orientation identical to that of a bent portion of a segment 1A, 1B of a pin 1 disposed in the same layer of the winding 400 as the corresponding conductor 4, 5.

More particularly, in order to create the terminal ends 10D1, 10D2 of the said electrical path 10, the first portion 4B of the first electrical connection unit 4 forms the first terminal end 10D1 of the said electrical path 10 of the rotary electrical machine 100, and the second portion 4C of the first electrical connection unit 4 is connected to the second end 10A2 of the first electrical path 10A. Similarly, the first portion 5B of the second electrical connection unit 5 forms the second terminal end 10D2 of the electrical path 10 of the rotary electrical machine 100, and the second portion 5C of the second electrical connection unit 5 is connected to the second end 10B2 of the second electrical path 10B.

The terminal ends 10D1, 10D2 extend axially spaced from the annular body 210, in order to facilitate the electrical connection of the said electrical path 10 of the rotary electrical machine 100 to the electrical network of the vehicle, via an electronic control board, and in particular an electric current conversion module (not represented) ensuring the conversion of a direct current into an alternating current, or conversely, according to the operating mode of the machine.

In order to ensure the same direction of circulation S1, S2, S3, S4 of the electric current passing through the layers C1-C4 of a single notch 213, two small electrical connection bars 6, 7 are each arranged between two notches 213 common to the said electrical path 10, on a single layer C2, C4.

Each small bar 6, 7 comprises two conductive portions 6A, 7A with a linear form, connected to one another by a connection part 6B, 7B.

Each conductive portion 6A, 7A of a single small bar 6, 7 is delimited by the connection part 6B, 7B emerging from the annular body 210 from the first axial end 211, and by an electrical connection portion 6C, 7C emerging from the annular body 210 from the second axial end 212. It will be understood that the conductive portions 6A, 7A, the connection part 6B, 7B and the electrical connection portions 6C, 7C of a single small bar 6, 7 form together a continuous current conduction element.

In practice, and similarly to the conductive pins 1, the conductive portions 6A, 7A of the small bars 6, 7 are inserted in their respective notches 213 from the first axial end 211 of the annular body 210 of the stator 200. The part of the conductive portions 6A, 7A of the small bars 6, 7 emerging from the annular body 210 of the stator 200 from the second axial end 212 is then bent in order to form the electrical connection portion 2C, 3C.

It will be understood that the conductive portions 6A, 7A of the small bars 6, 7 have an orientation which is identical to that of a bent portion of a segment 1A, 1B of a pin 1 disposed in the same layer of the winding 400 as the corresponding conductive portions 6A, 7A.

The conductive portions 6A, 7A of a single small bar 6, 7 are disposed in distinct notches 213. In a manner identical to the segments 1A, 1B of a single pin 1, the conductive portions 6A, 7A of a single small bar 6, 7 are spaced by a number of notches 213 equal to N−1, as previously defined. In addition, the conductive portions 6A, 7A of a single bar 6, 7 occupy a single layer of the winding 400 in each of these two notches 213.

It should be noted that a conductive portion 6A, 7A of at least one small bar 6, 7 is arranged in the notch 213 which receives the first conductor 2.

It will also be noted that the layers C2, C4 of the winding 400 which are occupied by the two conductive portions 6A, 7A of each small bar 6, 7 are distinct from the layers C1, C3 which are occupied by the first and second conductors 2, 3, and that the layers C2, C4 which are occupied by the conductive portions 6A, 7A of each small bar 6, 7 are distinct and not consecutive relative to one another. In this case, the conductive portions 6A of a first small bar 6 occupy the second layer C2, and the conductive portions 7A of a second small bar 7 occupy the fourth layer C4.

The conductive portions 6A, 7A of the small bars 6, 7 are positioned so as to fill the empty spaces left by the first and second conductors 2, 3 and by the first and second electrical connection units 4, 5. In fact, it will be understood that the linear portion 2A of the first conductor 2 which is disposed in the first layer C1 leaves an empty space in the second layer C2, and the linear portion 3A of the second conductor 3 which is disposed in the third layer C3 leaves an empty space in the fourth layer C4. Similarly, the linear portion 4A of the first electrical connection unit 4 which is disposed in the first layer C1 leaves an empty space in the second layer C2, and the linear portion 5A of the second electrical connection unit 5 which is disposed in the third layer C3 leaves an empty space in the fourth layer C4. These empty spaces left in the second layer C2 and in the fourth layer C4 are filled by the conductive portions 6A, 7A of the small bars 6, 7, in order to ensure a direction of circulation S1, S2, S3, S4 of the electric current in the notches 213 as defined.

The conductive portions 6A of the first small bar 6 occupying the second layer C2 are connected electrically to an end 1D of a first segment 1A of the first series A of pins 1 disposed in the first layer C1, and the conductive portions 7A of the second small bar 7 occupying the fourth layer C4 are connected electrically to an end 1D of a first segment 1A of the second series B of pins 1 disposed in the third layer C3.

Thus, the arrangement of the small electrical connection bars 6, 7 advantageously makes it possible to ensure that, in a single notch 213, the segments 1A, 1B of the conductive pins 1, and/or the linear portions 2A, 3A of the conductors 2, 3, and/or the linear portions 4A, 5A of the electrical connection units 4, 5 have an electric current passing through them which is oriented according to the same direction of circulation S1, S2, S3, S4.

It should be noted that the notches 213 in the annular body 210 of the stator 200 are filled only by the first and second segments 1A, 1B of the first and second series A, B of pins 1, whereas some notches 213 in the annular body 210 of the stator 200 are filled by at least one linear portion 2A, 3A of a conductor 2, 3, and/or at least one linear portion 4A, 5A of an electrical connection unit 4, 5, as defined.

It will thus be understood that the said electrical path 10 is delimited by the first portions 4B, 5B of the first and second electrical connection units 4, 5. Thus, according to this first embodiment, in a manner in common with the first conductor 2, the first electrical connection unit 4 occupies the first layer C1 of the winding 400, and, in a manner in common with the second conductor 3, the second electrical connection unit 5 occupies the third layer C3 of the winding 400.

As illustrated in FIG. 5, the connection part 6B, 7B of each small bar 6, 7 overlaps a plurality of pins 1 of the series A, B of pins 1 which is associated with it. More particularly, the connection part 6B, 7B of each small bar 6, 7 overlaps a plurality of corkscrewed sections of the elbow connections 1C of the series A, B of pins 1 which is associated with it. Even more particularly, the curved portion 2B of the first conductor 2 overlaps the connection part 6B of the first small bar 6.

An electric current input of the said electrical path 10 is then created by the first layer C1 of the winding 400, and an electric current output of this same electrical path 10 is created on the third layer C3 of the winding 400 via the first and second electrical connection units 4, 5. It will be understood that the said electrical connection path 10 has a single electric current passing through it.

It is advantageous that the electrical path 10 thus formed has the benefit of permitting in a single notch 213 a direction of circulation S1, S2, S3, S4 of the electric current which is identical in each of the layers C1-C4 of the corresponding notch 213. These common directions of circulation S1, S2, S3, S4 advantageously make it possible to limit the disturbances of the magnetic field.

It will also be noted that the electrical path 10 allows the electric current passing through the layers C1-C4 of two notches 213 of the electrical path 10 which succeed one another to be oriented in different directions.

In addition, it should be noted that two notches 213 which are symmetrically opposite one another relative to the axis are two notches 213 which are dedicated to a single electrical path 10. These two notches 213 which are symmetrically opposite one another relative to the axis O have the same electric current of the said electrical path 10 passing through them. This advantageously makes it possible to drive the magnetic pole in correspondence with the rotor 300.

Figure 7:
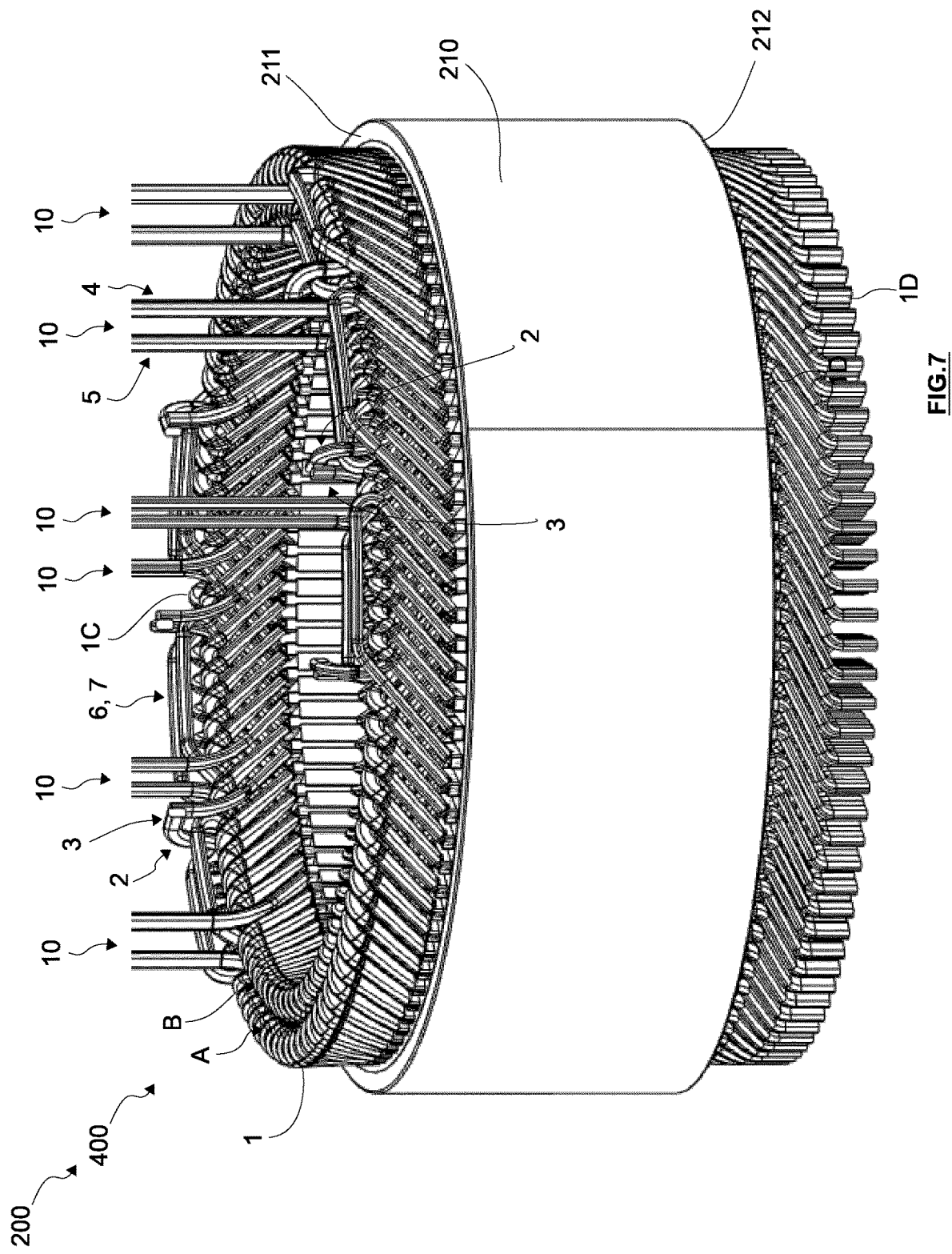
FIG. 7 illustrates a view in perspective of a stator equipped with a winding according to a second embodiment of the invention.
Figure 8:
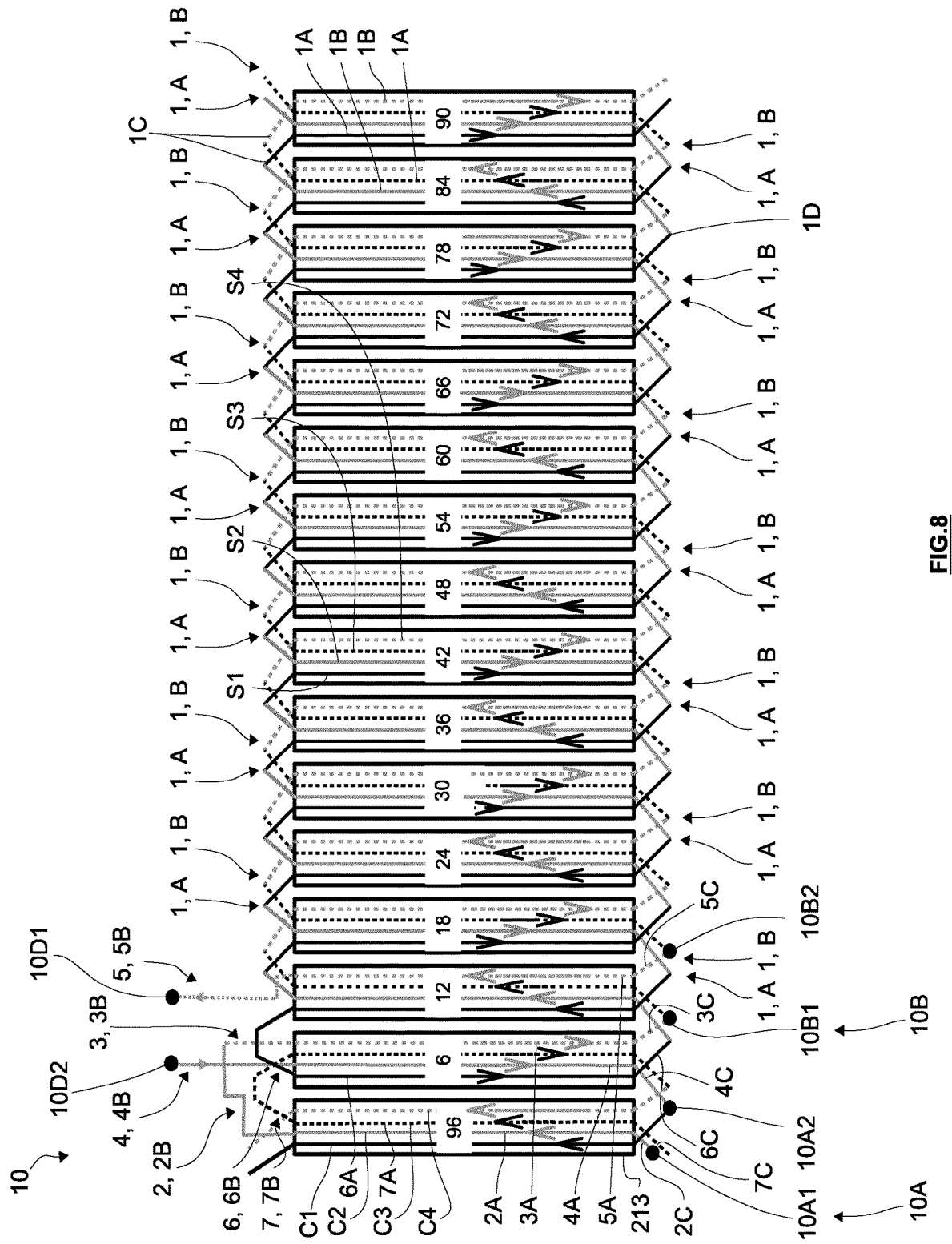
FIG. 8 illustrates schematically an electrical path formed in the stator equipped with a winding according to the second embodiment.
Figure 11:
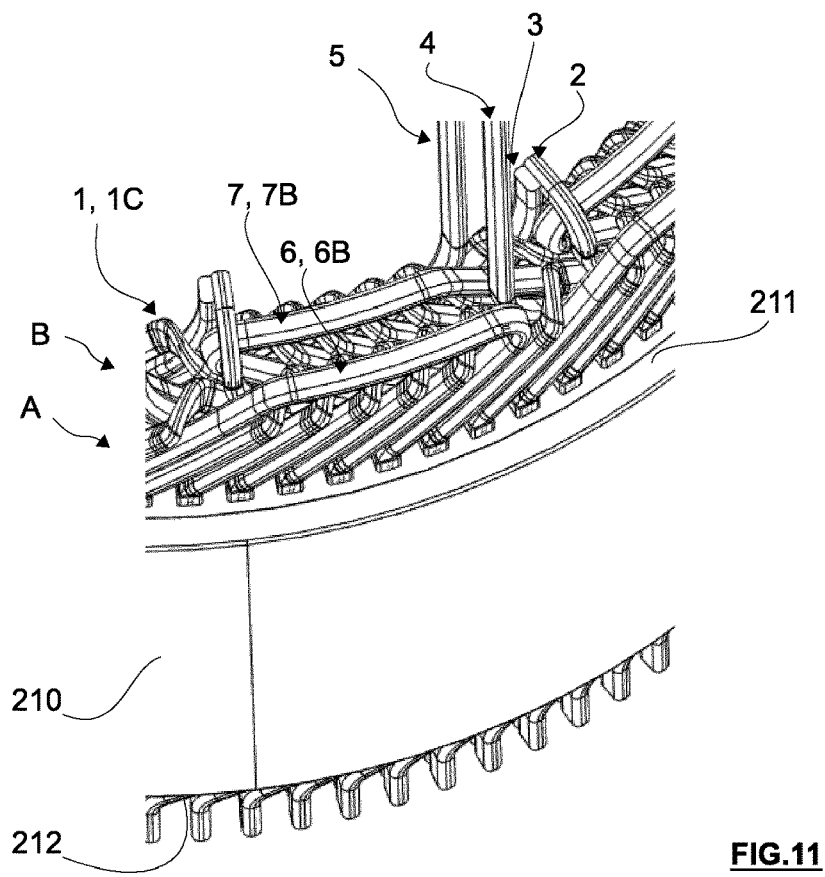
FIG. 11 illustrates a detail of the stator equipped with the winding according to the second embodiment illustrated in FIGS. 7 and 8, which represent in greater detail conductors and electrical connection units permitting the formation of an electrical path according to this second embodiment.

A description will now be provided of a second embodiment with reference to FIGS. 7, 8 and 11. The winding 400 according to this second embodiment is similar to that of the first embodiment, and comprises the same number of electrical paths 10. This second embodiment differs from the first embodiment by particular arrangements of the electrical conductors 2, 3, of the electrical connection units 4, 5, and of the small electrical connection bars 6, 7 previously described.

Hereinafter in the description of this second embodiment, and in order to simplify understanding of the invention, only one of these electrical paths 10 will be described.

An electrical path 10 of this type is formed in a manner similar to that of the first embodiment.

FIG. 8 represents schematically an electrical path 10 of this type according to this second embodiment. Hereinafter in the description relative to this second embodiment, reference will be able to be made to FIG. 8 at any time in order to facilitate understanding of the invention.

In a manner similar to the first embodiment, the first conductor 2 and the second conductor 3 make it possible to connect the first electrical path 10A and the second electrical path 10B to one another electrically.

According to a specific feature of this second embodiment, the linear portion 2A of the first conductor 2 occupies in its notch 213 the second layer C2 of the winding 400, and the linear portion 3A of the second conductor 3 occupies in its notch 213 the fourth layer C4 of the winding 400. In a manner similar to the first embodiment, the linear portion 2A of the first conductor 2 is separated from the linear portion 3A of the second conductor 3 by a layer, in this case the third layer C3.

The first and second conductors 2, 3 are connected electrically to one another by their curved portion 2B, 3B, from the first axial end 211 of the annular body 210 of the stator 200.

It will thus be understood that the first conductor 2 and the second conductor 3 make it possible to connect the second layer C2 of the winding 400 and the fourth layer C4 of the winding 400 to one another electrically.

In a manner similar to the first embodiment, the first electrical connection unit 4 and the second electrical connection unit 5 make it possible to form the terminal ends 10D1, 10D2 of the said electrical path 10 according to this second embodiment.

With reference to this second embodiment, the linear portion 4A of the first electrical connection unit 4 occupies the second layer C2 of the winding 400, in order to form a first terminal end 10D1 of the said electrical path 10, and the linear portion 5A of the second electrical connection unit 5 occupies the fourth layer C4 of the winding 400 in order to form a second terminal end 10D2 of the said electrical path 10.

According to this second embodiment, the conductive portions 6A of the first small bar 6 occupy the first layer C1 of the winding 400, and the conductive portions 7A of the second small bar 7 occupy the third layer C3 of the winding 400.

The conductive portions 6A of the first small bar 6 occupying the first layer C1 are connected electrically to an end 1D of a first segment 1A of the first series A of pins 1, and the conductive portions 7A of the second small bar 7 occupying the third layer C3 are connected electrically to an end 1D of a first segment 1A of the second series B of pins 1.

It will thus be understood that, according to this second embodiment, the said electrical path 10 is delimited by the first portions 4B, 5B of the first and second electrical connection units 4, 5. Thus, according to this second embodiment, the first electrical connection unit 4, in a manner in common with the first conductor 2, the second layer C2 of the winding 400 and the second electrical connection unit 5, occupies the fourth layer C4 of the winding 400, in a manner in common with the second conductor 3.

According to this second embodiment, an electrical current input of the said electrical path 10 is thus created by the second layer C2 of the winding 400, and an electrical current output of this same electrical path 10 is created on the fourth layer C4 of the winding 400. It will be understood that the said electrical path 10 has a single electric current passing through it.

It will be understood that, in this second embodiment, the first and second conductors 2, 3 of the electrical connection element are disposed radially further to the interior of the stator than in the configuration provided in the first embodiment.

Figure 9:
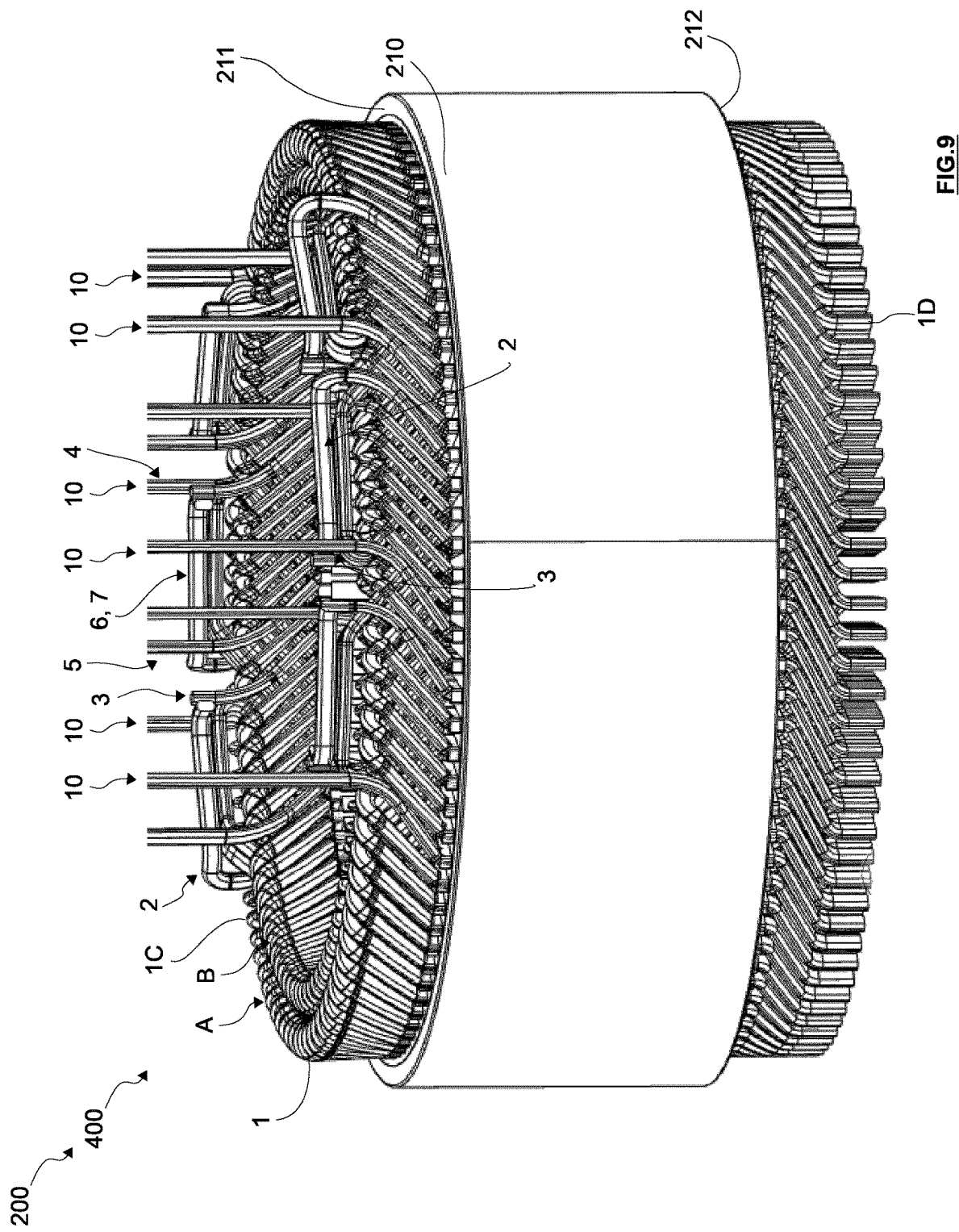
FIG. 9 illustrates a view in perspective of a stator equipped with a winding according to a third embodiment of the invention.
Figure 10:
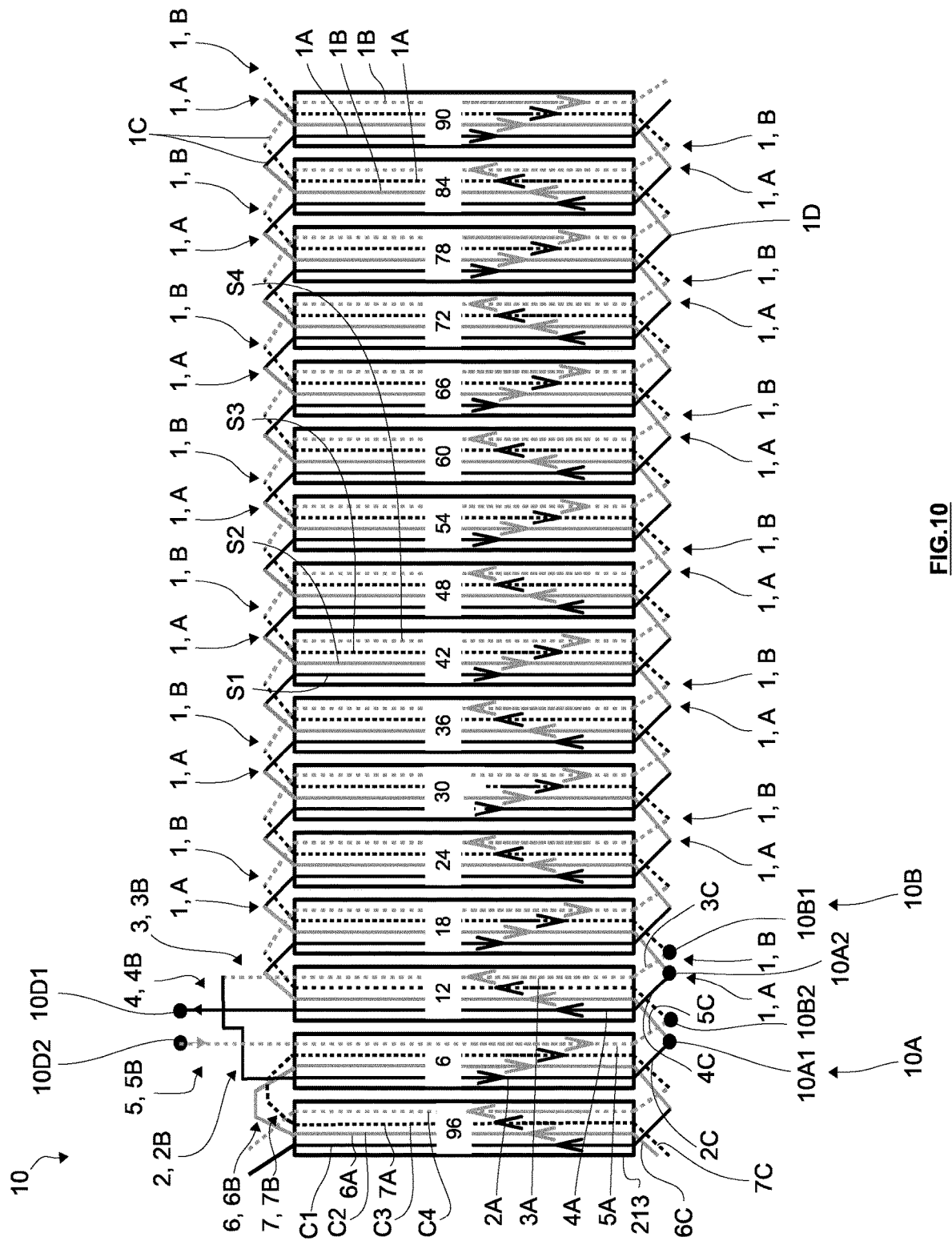
FIG. 10 illustrates schematically an electrical path formed in the stator equipped with a winding according to the third embodiment.
Figure 12:
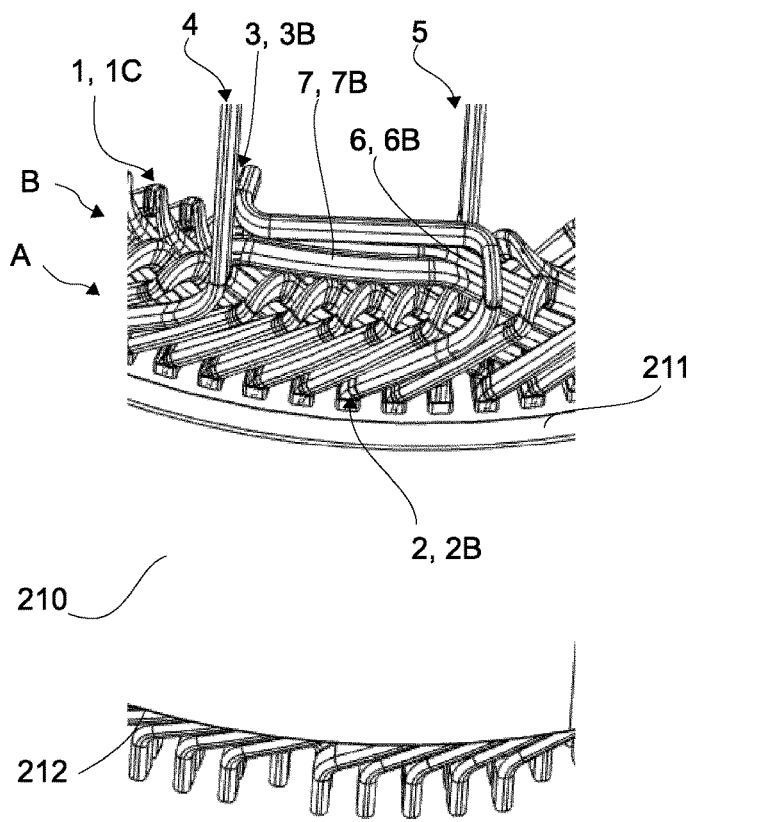
FIG. 12 illustrates a detail of the stator equipped with the winding according to the third embodiment illustrated in FIGS. 9 and 10, which represent in greater detail conductors and electrical connection units permitting the formation of an electrical path according to this third embodiment.

A description will now be provided of a third embodiment with reference to FIGS. 9, 10 and 12. The winding 400 of this third embodiment is similar to that of the first embodiment, and comprises the same number of electrical paths 10. This third embodiment differs from the first embodiment by particular arrangements of the electrical conductors 2, 3 of the electrical connection units 4, 5 and of the small electrical connection bars 6, 7 previously described.

Hereinafter in the description of this third embodiment, and in order to simplify understanding of the invention, only one of these electrical paths 10 will be described. An electrical path 10 of this type is formed in a manner similar to that of the first embodiment.

FIG. 10 represents schematically and electrical path 10 of this type according to this third embodiment. Hereinafter in the description relative to this third embodiment, reference will be able to be made to FIG. 10 at any time in order to facilitate understanding of the invention.

In a manner similar to the first embodiment, the first conductor 2 and the second conductor 3 make it possible to connect the first electrical path 10A and the second electrical path 10B to one another electrically.

According to a specific feature of this third embodiment, the linear portion 2A of the first conductor 2 occupies in its notch 213 the first layer C1 of the winding 400, and the linear portion 3A of the second conductor 3 occupies in its notch 213 the fourth layer C4 of the winding 400. In a manner distinct from the first and second embodiments, the linear portion 2A of the first conductor 2 is separated from the linear portion 3A of the second conductor 3 by two layers, in this case the third layer C3 and the second layer C2.

The first and second conductors 2, 3 of an electrical connection element are connected electrically to one another by their curved portion 2B, 3B, from the first axial end 211 of the annular body 210 of the stator 200.

With reference to FIG. 12, in order to connect the first conductor 2 and the second conductor 3 according to this third embodiment electrically, the curved portion 2B of the first conductor 2 overlaps a pin 1 of the first series A and a pin 1 of the second series B, in order to be connected electrically to the curved portion 3B of the second conductor 3.

It will thus be understood that the first conductor 2 and the second conductor 3 make it possible to connect the first layer C1 of the winding 400 and the fourth layer C4 of the winding 400 to one another electrically.

In a manner similar to the first embodiment, the first electrical connection unit 4 and the second electrical connection unit 5 make it possible to form the terminal ends 10D1, 10D2 of the said electrical path 10 according to this third embodiment.

With reference to this third embodiment, the linear portion 4A of the first electrical connection unit 4 occupies the first layer C1 of the winding 400, in order to form a first terminal end 10D1 of the said electrical path 10, and the linear portion 5A of the second electrical connection unit 5 occupies the fourth layer C4 of the winding 400 in order to form a second terminal end 10D2 of the said electrical path 10.

According to this third embodiment, the conductive portions 6A of the first small bar 6 occupy the second layer C2 of the winding 400, and the conductive portions 7A of the second small bar 7 occupy the third layer C3 of the winding 400.

The conductive portions 6A of the first small bar 6 occupying the second layer C2 are connected electrically to an end 1D of a first segment 1A of the first series A of pins 1, and the conductive portions 7A of the second small bar 7 occupying the third layer C3 are connected electrically to an end 1D of a first segment 1A of the second series B of pins 1.

As illustrated in FIG. 12, the connection part 6B, 7B of each small bar 6, 7 overlaps at least one pin 1 of the series A, B of pins 1 which is associated with it. More particularly, the connection part 6B, 7B of each small bar 6, 7 overlaps at least one elbow connection 1C of a pin 1 of the series A, B of pins 1 which is associated with it. Even more particularly, the curved portion 2B, 3B of the first conductor 2 overlaps the connection part 6B of the first small bar 6 and the connection part 7B of the second small bar 7.

It will thus be understood that, according to this third embodiment, the said electrical path 10 is delimited by the first portions 4B, 5B of the first and second electrical connection units 4, 5. Thus, according to this third embodiment, in the manner in common with the first conductor 2, the first layer C1 of the winding 400 and the second electrical connection unit 5, the first electrical connection unit 4 occupies the fourth layer C4 of the winding 400, in a manner in common with the second conductor 3.

According to this third embodiment, an electric current input of the said electrical path 10 is thus created by the fourth layer C4 of the winding 400, and an electric current output of this same electrical path 10 is created on the first layer C1 of the winding 400. It will be understood that the said electrical path 10 has a single electric current passing through it.

It will be understood that, in this third embodiment, the first conductor 2 is disposed radially on the exterior of the stator, and the second conductor 3 is disposed radially in the interior of the stator, with a maximal spacing compared with the configuration provided in the first embodiment. The first and second conductors 2, 3 are thus disposed on the periphery of their respective notch 213. It will be understood that the same applies to the first and second electrical connection units 4, 5.

It will be appreciated that the characteristics, variants and different embodiments of the invention can be associated with one another according to various combinations, provided that they are not incompatible or mutually exclusive. In particular, it will be possible to conceive of variants of the invention comprising only a selection of characteristics described hereinafter in a manner isolated from the other characteristics described, if this selection of characteristics is sufficient to provide a technical advantage or to differentiate the invention from the prior art.

The invention claimed is:

1. A stator for a rotary electrical machine which is designed to equip a vehicle, the stator comprising:
    an annular body around an axis; and
    a winding,
    the annular body comprising a plurality of notches distributed circumferentially regularly around the annular body, and
    the winding comprising a first series of conductive pins and a second series of conductive pins arranged in the notches in a plurality of superimposed layers of the winding in a radial direction, i.e. at least a first layer, a second layer, a third layer and a fourth layer which succeed one another, such that the first layer is radially on the exterior and the fourth layer is radially in the interior, with each conductive pin comprising a first segment and a second segment which are connected by an elbow connection, such that the segments of a single conductive pin are disposed in distinct notches,
    wherein the first segments and the second segments of the first series of pins are arranged respectively in the first layer of the winding and in the second layer of the winding, and the first segments and the second segments of the second series of pins are arranged respectively in the third layer of the winding and in the fourth layer of the winding,
    wherein the first series of pins is connected electrically to the second series of pins,
    wherein an electrical connection element comprises a first conductor and a second conductor which are partly disposed in distinct notches, with the first conductor occupying one of the layers which are common to the first series of pins, and the second conductor occupying one of the layers which are common to the second series of pins,
    wherein the first conductor and the second conductor being connected electrically to one another, the first conductor and the second conductor occupying two distinct layers of the winding, and being separated from one another by at least one layer, and
    wherein the first series of pins is connected electrically in series by the electrical connection element to the second series of pins.

2. The stator according to claim 1, wherein the first conductor occupies the first layer of the winding and the second conductor occupies the third layer of the winding.

3. The stator according to claim 1, wherein the first conductor occupies the second layer of the winding and the second conductor occupies the fourth layer of the winding.

4. The stator according to claim 1, wherein the first conductor occupies the first layer of the winding and the second conductor occupies the fourth layer of the winding.

5. The stator according to claim 1, wherein the first conductor and the second conductor each comprise a linear portion and a curved portion, the linear portions being accommodated in their respective notch and the curved portions being connected electrically to one another.

6. The stator according to claim 5, wherein the curved portion of at least one of the first or second conductors overlaps at least a part of a pin of one of the series of pins.

7. The stator according to claim 1, wherein at least one small electrical connection bar is arranged between two notches, with the small bar having two conductive portions occupying a single layer of the winding in each of these two notches and a connection part connecting these two conductive portions, and in that the layer of the winding occupied by the two conductive portions is distinct from the layers occupied by the first and second conductors.

8. The stator according to claim 7, wherein the connection part of the small bar overlaps at least one pin of one of the series of pins.

9. The stator according to claim 7, wherein the curved portion of at least one of the first or second conductors overlaps the connection part of the small bar.

10. The stator according to claim 1, wherein the first conductor and the second conductor are directly connected to one another.

11. A rotary electrical machine for a motor vehicle comprising a stator according to claim 1.

\* \* \* \* \*